United States Patent [19]

Bruder et al.

[11] Patent Number: 4,848,151

[45] Date of Patent: Jul. 18, 1989

[54] LIQUID LEVEL DETECTOR

[75] Inventors: John R. Bruder; Gerald M. Sivulka, both of Ann Arbor, Mich.; Leonard T. Tribe, Seal Beach, Calif.

[73] Assignee: Kelsey-Hayes Company, Romulus, Mich.

[21] Appl. No.: 854,252

[22] Filed: Apr. 21, 1986

Related U.S. Application Data

[62] Division of Ser. No. 709,619, Mar. 8, 1985, Pat. No. 4,600,820.

[51] Int. Cl.$^{4}$ ........................ G01F 23/32; H01H 35/18

[52] U.S. Cl. ........................................ 73/308; 73/317; 200/84 C; 340/625

[58] Field of Search ....................... 73/309, 308, 322.5, 73/454, 308, 313, 317; 340/59, 625; 123/192 B; 184/13.1, 103.2

[56] References Cited

U.S. PATENT DOCUMENTS

| | | | |
|---|---|---|---|
| 2,627,178 | 2/1953 | Hayward et al. | 73/322.5 X |
| 3,196,389 | 7/1965 | Heidner | 340/59 X |
| 3,605,086 | 9/1971 | Triska | 340/59 |
| 3,868,485 | 2/1975 | Sykes et al. | 73/322.5 X |
| 4,037,481 | 7/1977 | Callahan | 73/454 |
| 4,353,253 | 10/1982 | Callahan | 73/322.5 X |
| 4,481,389 | 11/1984 | Johnson | 200/84 C |
| 4,610,165 | 9/1986 | Duffy et al. | 73/317 |

FOREIGN PATENT DOCUMENTS

| | | | |
|---|---|---|---|
| 0334569 | 7/1934 | Fed. Rep. of Germany | 73/317 |

*Primary Examiner*—Daniel M. Yasich

*Attorney, Agent, or Firm*—Ralph J. Skinkiss

[57] ABSTRACT

The present invention provides an automatic cut off switch which grounds the magneto-spark plug circuit of a small gasoline engine shutting the engine down when the quantity of lubricating oil within the sump falls below a predetermined quantity. The switch is operated by a balance beam float assembly housed within a protective shroud. The protective shroud acts to collect a relatively stable pool of oil, representative of the quantity of oil remaining in the sump, for activation of the balance beam float. Upon refilling of the oil sump the switch automatically resets thereby permitting re-start of the engine.

2 Claims, 5 Drawing Sheets

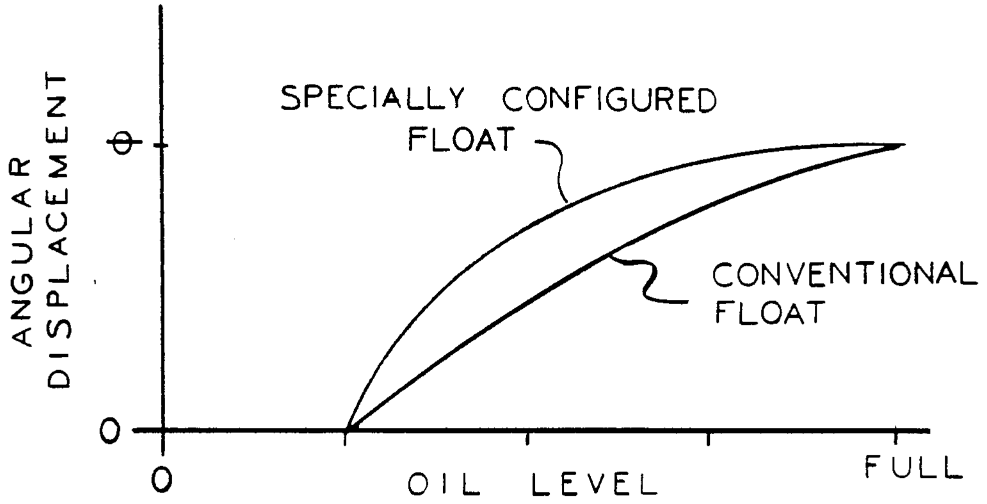
FIG. 7
FIG. 8
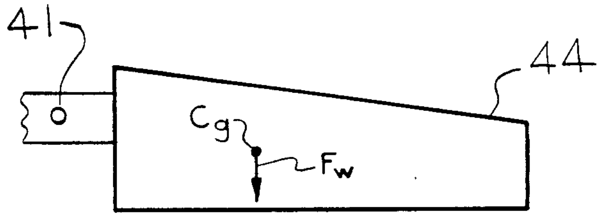
(a)
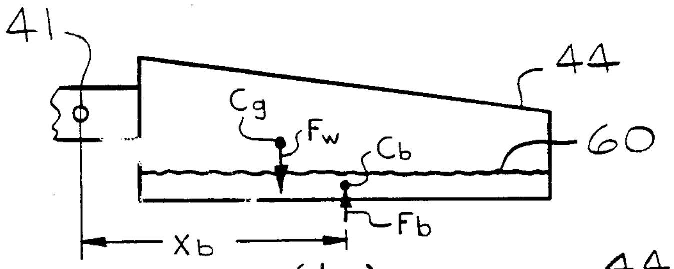
(b)
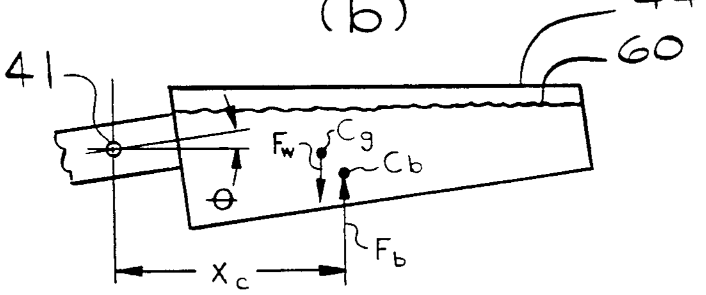
(c)

LIQUID LEVEL DETECTOR

This is a division, of application Ser. No. 709,619, filed Mar. 8, 1985.

The aforementioned parent application has matured into U.S. Pat. No. 4,600,820.

BACKGROUND OF THE INVENTION

The present invention relates to a switch assembly which acts to ground the ignition circuit of a small gasoline engine thereby shutting the engine down and/or preventing start up when the quantity of lubricating oil within the engine sump reaches a predetermined low or inadequate level.

In the tool rental industry and as the construction industry small gasoline engines, ranging from approximately 2½ to 18 horsepower, are commonly used to operate equipment such as cement mixers, electrical generators, and other miscellaneous machinery. Under such use, routine maintenance of the small gasoline engines is generally overlooked or ignored. It is not uncommon for such engines to be operated until the engine cylinder "freezes" because of an insufficient quantity of lubricating oil within the engine sump.

The present invention teaches an oil sensing cut off switch which grounds the engine ignition circuit when the oil level within the sump reaches a predetermined low or inadequate level.

SUMMARY OF THE INVENTION

The invention taught herein comprises an on/off electrical switch directly operated by the action of a balance beam float assembly. The switch, when closed, grounds the engine's ignition circuit thereby shutting the engine down. The balance beam float assembly comprises a solid float, having a density greater than the engines lubricating oil within which it is submerged, counter balanced by a counterweight. So long as the solid float is submerged within engine oil a buoyant force, proportional to the volume of oil displaced by the float, creates a moment about the balance beam pivot. As long as the sump oil quantity is within a desired range the balance beam float assumes an equilibrium position whereby the electrical switch remains open permitting the engine to operate.

Should the sump oil quantity fall below a desired minimum, the balance beam float assembly rotates to a position whereat the electrical switch is caused to close thereby grounding the magneto/spark plug electrical circuit and shuts down the engine. Upon filling the engine crank case with additional oil the balance beam float assembly automatically re-sets the electrical switch to the open position thereby permitting re-start of engine but only after the addition of a predetermined quantity of added oil.

Because of the severe turbulent state of the oil, in a small engine sump, no definable surface level exists which can be conveniently measured. Therefore, out balance beam float is encapsulated within a protective shroud or shield. The shield entraps, therein, a controlled quantity of relatively stable oil the level of which, within the shield, is representative of the oil quantity remaining in the engine sump. Thus the entrapped pool of oil within the shield serves to operate the balance beam float assembly as described above.

DESCRIPTION OF THE DRAWINGS

FIG. 7 compares the angular rotation of a balance beam float assembly having a conventional float and a specially configured float as a function of oil level.

FIG. 8 schematically shows the movement of the center of buoyancy as a function of oil level for a float system as taught herein.

DETAILED DESCRIPTION OF THE INVENTION

Figure 1:
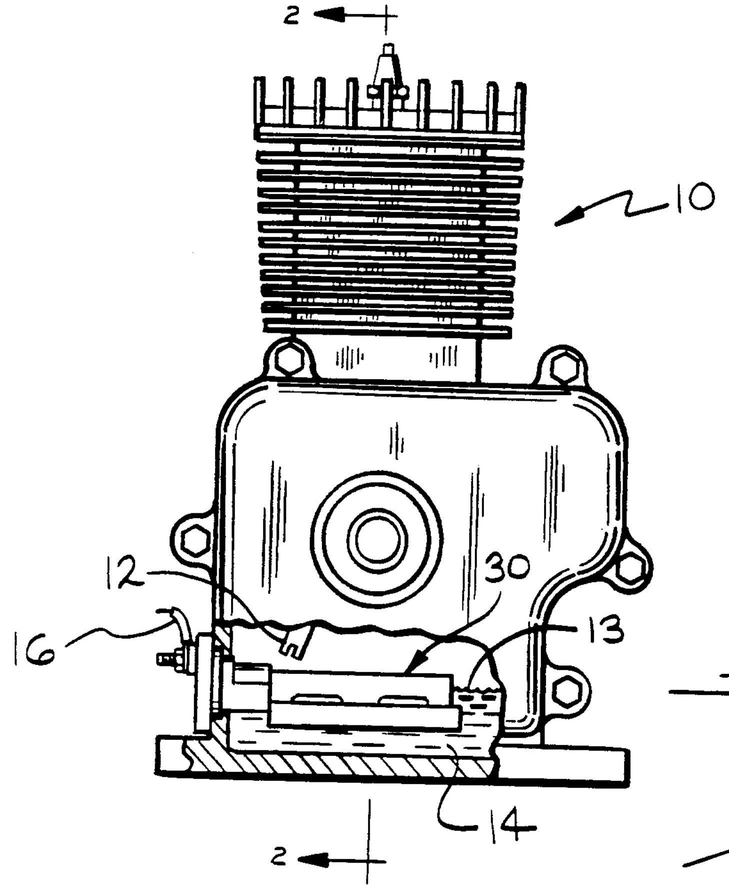
FIG. 1 depicts a typical small gasoline engine showing, in cut away, the general location and position of our cut off switch assembly.
Figure 3:
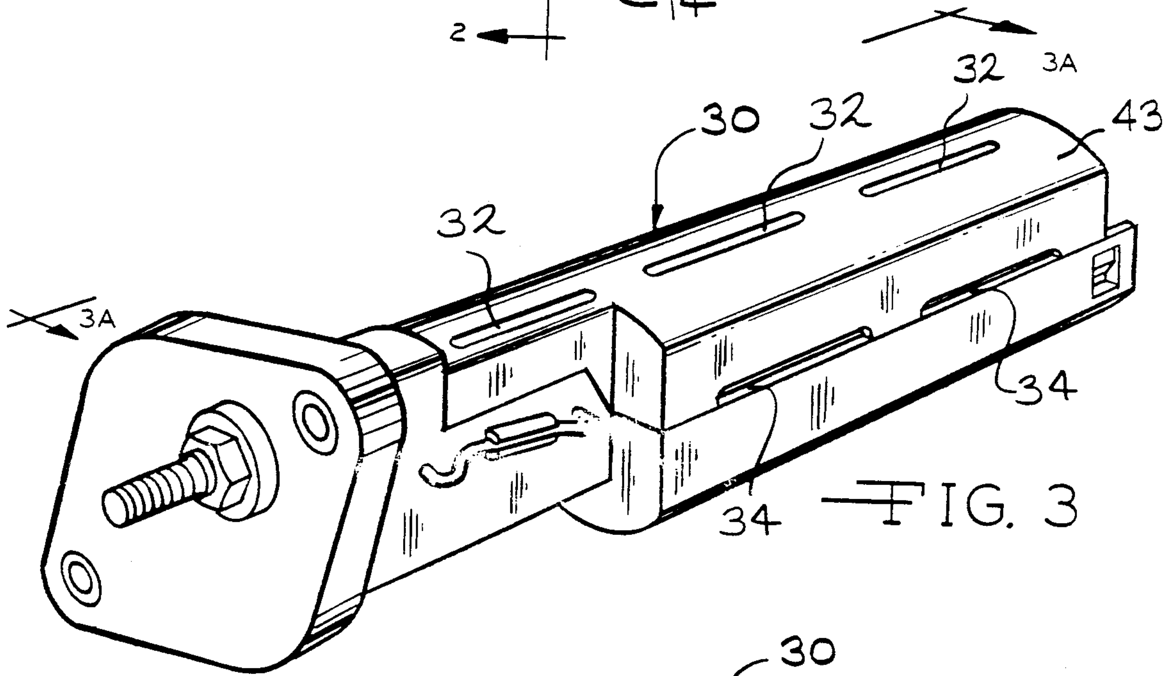
FIG. 3 is perspective view of our cut off switch assembly.
Figure 3A:
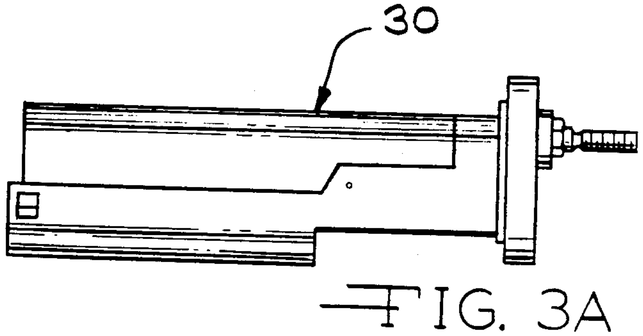
FIG. 3A is an elevational view taken along line 3A—3A in FIG. 3.
Figure 2:
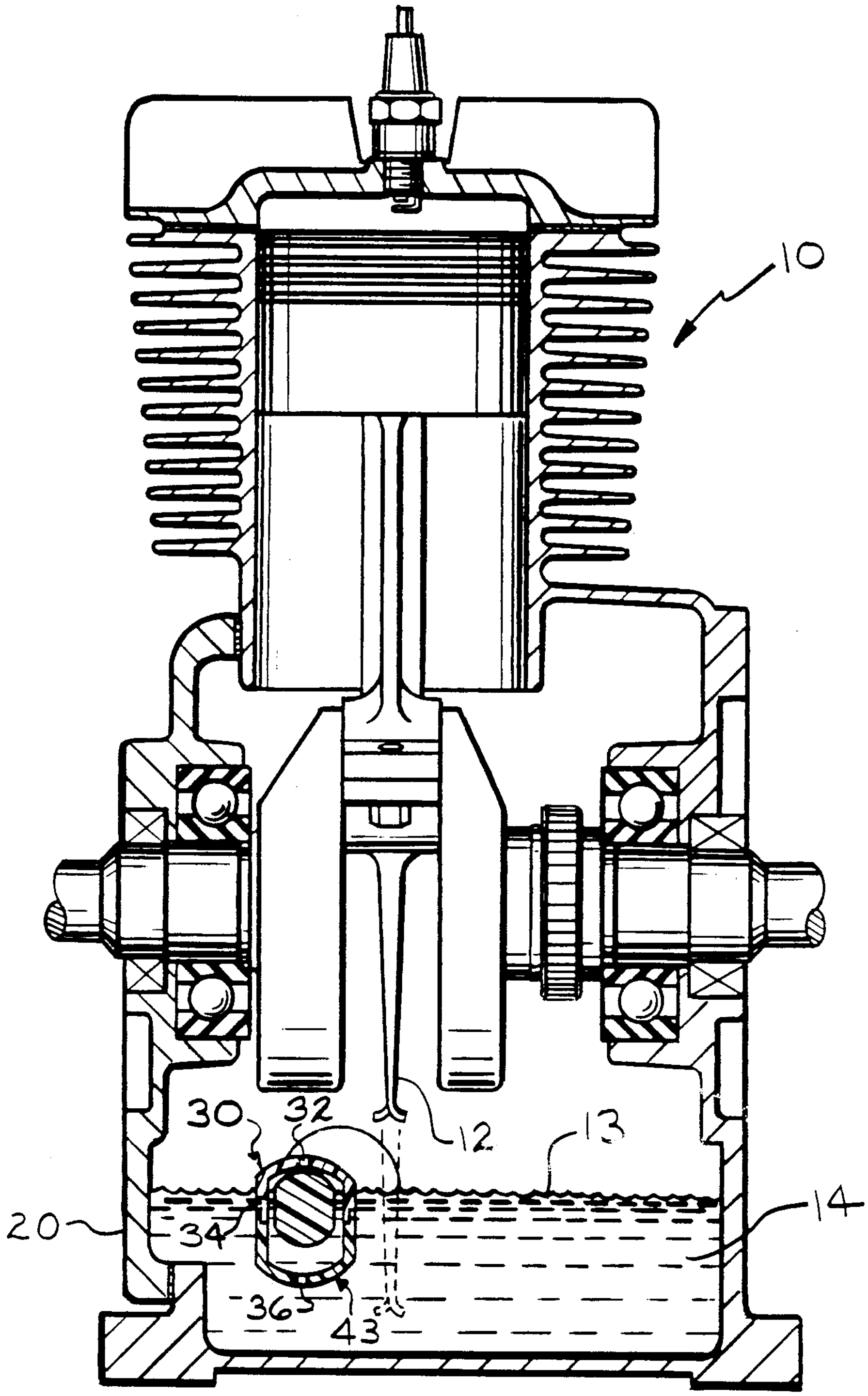
FIG. 2 is a cross-sectional view taken along line 2—2 of FIG. 1 showing the general position of our cut off switch assembly in relation to other engine components.
Figure 4:
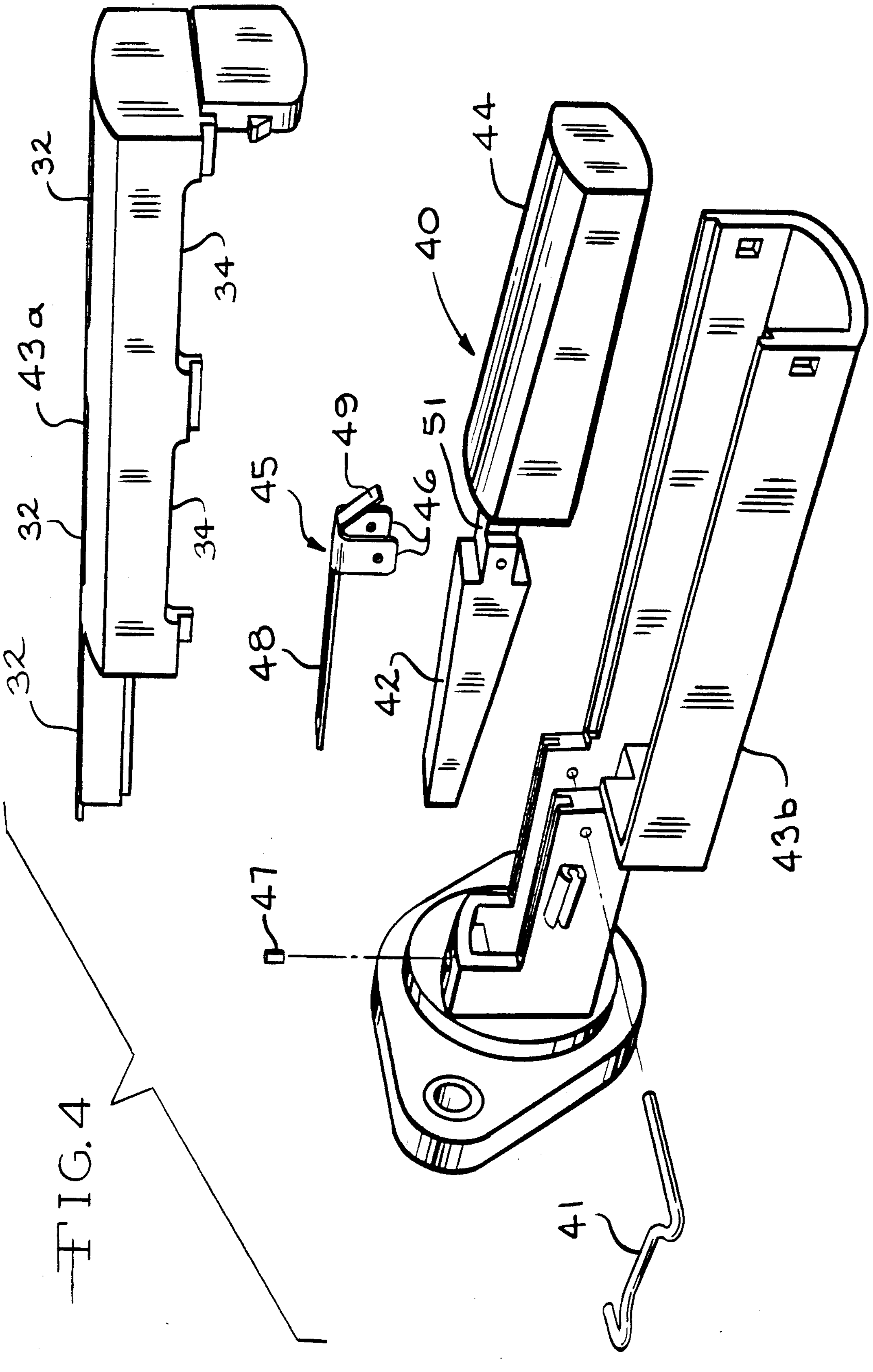
FIG. 4 is an exploded perspective showing the operating elements of our cut off switch assembly.

Referring to FIGS. 1 and 2 a balance beam float actuated switch assembly 30 is shown positioned within the oil sump of small gasoline engine 10. For simplicity of explanation FIGS. 1 through 6 depict the engine 10 in its non operating or idle state. Therefore the lubricating oil 14 is shown to have a definite surface level 13.

It is assumed to be understood by the reader that, when operating, small gasoline engines of the type described herein have no definable oil level surface because of the violent action of splasher 12 in affecting splash and spray lubrication of the engine cylinder and other moving parts.

Although the preferred embodiment of switch assembly 30, as shown herein, is of a generally long and narrow configuration, such configuration has been necessarily dictated by the particular application confronting the inventor. A configuration of other general proportions may also be employed, depending upon end applications, without departing from the invention herein taught and claimed.

Turning now to FIGS. 3 through 6 the primary operating element of switch assembly 30 is balance beam float 40. Balance beam float assembly 40 is an elongate assembly comprising a counterweight 42 and a solid float member 44 affixed to pivot arm 51 extending from counterweight 42.

Preferably, for our application, counterweight 42 and pivot arm 51 comprise a solid unitary metal member of copper impregnated sintered iron. Although float 44 may comprise a typical hollow float structure for some applications, it was found for our application that a solid float structure of a material having a density greater than that of lubricating oil was most preferred to build into the system an inherent damping affect as is further described below. Float 44 is injection molded nylon having a density greater than that of the lubricating oil.

Balance beam float assembly 40 is pivotly retained within the bottom portion of float protection shield **43*b*** by pivot pin 41. Pivot pin 41 also serves as a critical element in the electrical circuit of switch assembly 30 providing an electrical ground between the engine crank case 20 and the switch mechanism as will be described below.

Also pivoted about pivot pin 41 is ferrous metal switching lever 45. Switching lever 45 comprises contact arm 48 and pivot tangs 46 which straddle counterweight pivot arm 51 and pivotly engage pivot pin 41. Extending oppositely from contact lever 48 is switching lever release tang 49, the function of which is more fully described in the following operations discussion. Contact arm 48 normally lies juxtaposed to the top surface of counterweight 42 as is shown in FIG. 6.

Figure 5:
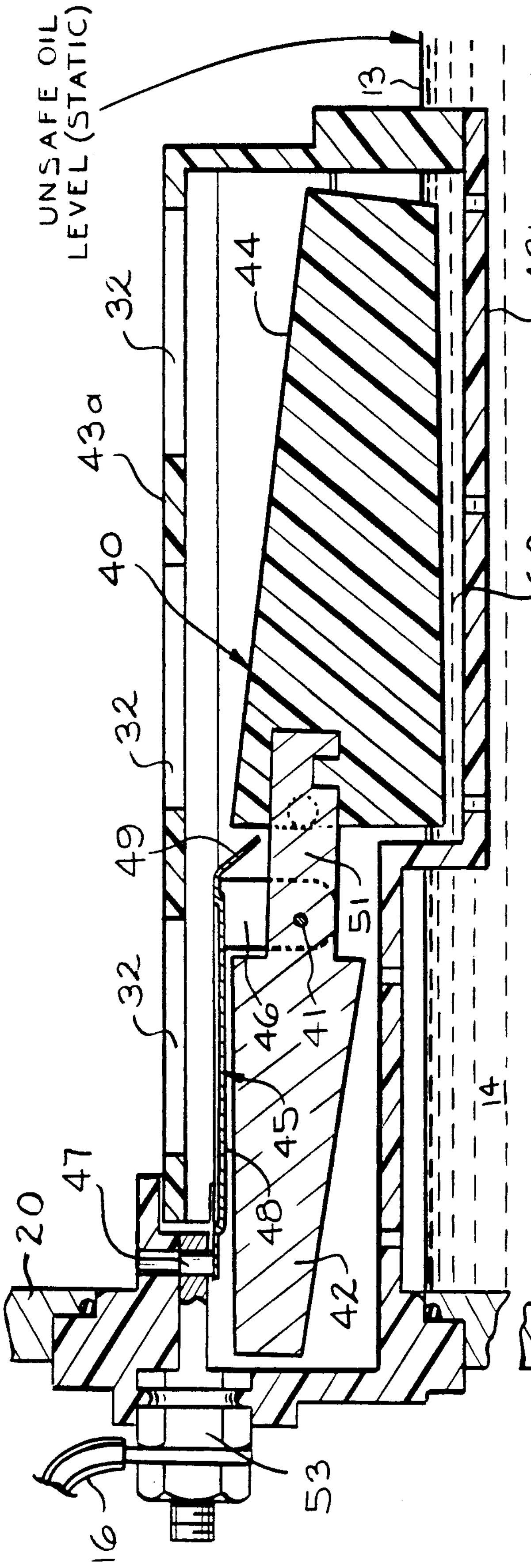
FIG. 5 is a longitudinal cross-section of our cut off switch assembly showing the position of elements when the engine sump oil level is at or below a safe operating level.

When assembled upon pivot pin 41 and free from the buoyancy effect of the entrapped engine oil 60 within shield 43*a*, the balance of balance beam float assembly 40 plus switching lever 45 is such that a clockwise moment (as viewed in FIG. 5) exists about pivot pin 41 causing the balance beam float assembly 40 to rotate clockwise until contact arm 48 and counterweight 42 abuts contact magnet 47 which projects through an extended portion of terminal connector 53 as shown in FIG. 5.

When as shown in this configuration (FIG. 5) an electrical circuit is thus completed and comprises in series: terminal connector 53, magnet 47, switching lever 45, and pivot pin 41 which is in electrical grounding contact with the engine crank case 20 when the switch assembly 30 is installed in small engine 10.

Figure 6:
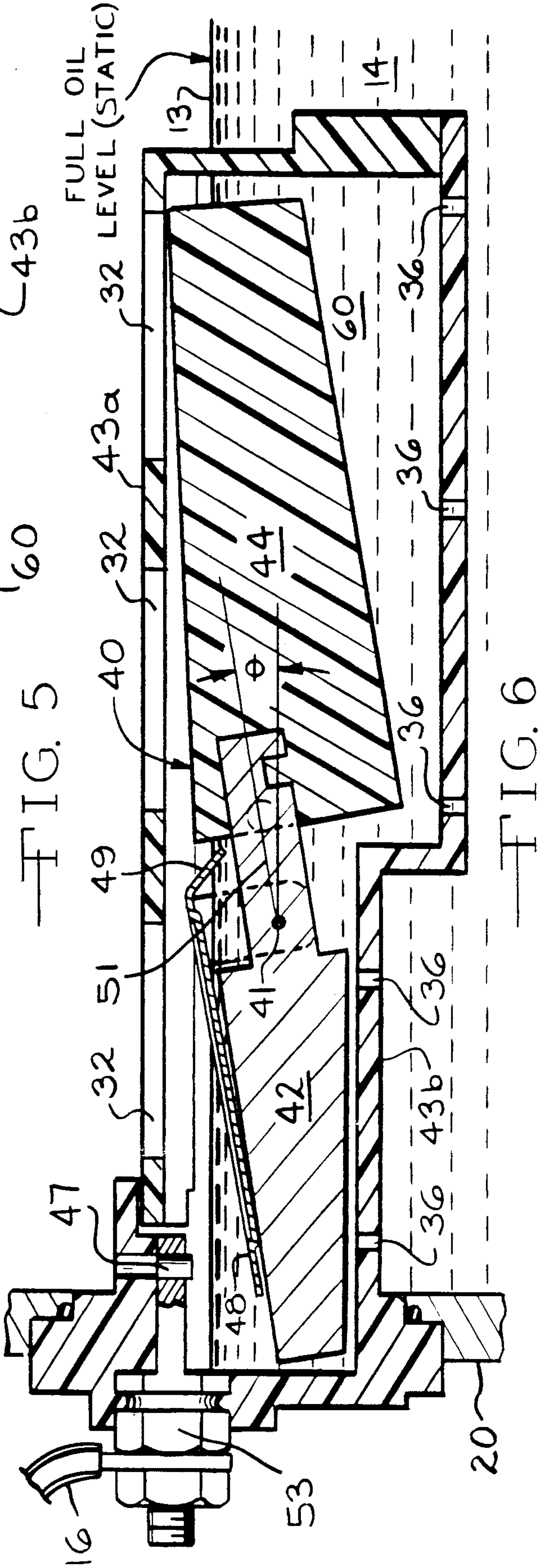
FIG. 6 is a longitudinal cross-section of our cut off switch assembly showing the position of elements when the engine oil sump is full.

The balance beam float assembly 40 and the switching lever 45 are totally enclosed within a non electrically conducting protection shield 43 as illustrated in FIGS. 2, 5 and 6. The encapsulating shield 43 comprises a "snap together" top portion 43*a* and bottom portion 43*b*. The shield is made of high temperature resistant injection molded thermosetting resinous material and configured to "snap together" in a way common to such parts and readily understandable by viewing figures 3, 4, 5 and 6.

Encapsulating shield 43 is provided with laterally extending openings or apertures 32 along the top of upper portion 43*a* and similar slotted openings 34 along the side of the shield facing away from splasher 12. Because of the turbulent effect of splasher 12 upon the oil surface 13, the side of shield 43 adjacent splasher 12 is preferably solid having no openings. The bottom shield portion 43*b* is further provided with oil drain holes 36. The function and operation of openings 32 and 34 along with drain holes 36 is described in further detail in the following operation discussion.

OPERATION (a) Engine Electrics

With respect to the small gasoline engine electrics our engine cut off switch is relatively simple. The switch is integrated into the spark plug ignition circuit such that when the switching lever 45 is closed (in contact with magnet 47), the ignition circuit is rendered inoperative. This may be accomplished most simply be connecting terminal wire 16 to the spark plug lead wire (not shown). Thus the cut off switch when closed, because of a low oil level condition, electrically grounds the spark plug to the engine case through the circuit path previously described.

Our engine cut off switch may also be integrated into the ignition circuit whereby closing of switching lever 45 acts to directly ground the magneto primary coil.

(b) Mechanical Operation

When the engine oil sump is empty or dry the operating elements of the cut off switch assume the general configuration as shown in figure 5. The clockwise moment created by float 44, about pivot pin 41, is greater than the counter clockwise moment created by the combination of counterweight 42 and switching lever 45. Thus the balance beam float assembly 40 is caused to rotate clockwise until the switching lever contact arm 48, supported upon counterweight 42, engages contact magnet 47. In this configuration the electrical circuit from terminal connector 53, through contact magnet 47, switching lever 45, pivot pin 41, and to the engine case 20 is complete and the engine ignition circuit is grounded. Thus the engine cannot be operated.

However, as lubricating oil 14 is added to the engine sump, float 44, having a density greater than that of the oil becomes increasingly submerged within the oil pool 60. A buoyant force, proportional to the quantity of oil displaced by float 44, begins to act upon float 44. As the oil rises and the buoyant force upon float 44 increases and the summation of moments acting upon the balance beam float assembly 40, about pivot pin 41, approach zero. At this point the balance beam float assembly 40 is in a state of buoyant equilibrium. As the oil continues rise the counter clockwise buoyancy moment acting upon float 44 continues to increase. The balance beam float assembly 40 now beings a counter clockwise rotation, about pivot pin 41, proportional to the rising level of oil 13. However, as counterweight 42 begins to rotate counter clockwise, switching lever 45 remains magnetically attached to contact magnet 47 until pivot arm 51 engages lever release tang 49. At this point additional counter clockwise rotation of the balance beam float assembly 40 exerts a force upon tang 49 sufficient to overcome the magnetic attraction between contact magnet 47 and contact arm 48 of switching lever 45 thereby forcing contact arm 48 away from magnet 47 and opening the switch. When this event happens there is sufficient lubricating oil in the sump to permit safe operation and the engine may be started. When the engine sump is at its recommended full capacity the balance beam float assembly 40 and switching lever 45 assume the configuration as shown in FIG. 6.

As now becomes apparent, the relationship between the lever release tang 49 and pivot arm 51 is critical as that relationship determines the sump oil level necessary to break the magnetic attraction between contact arm 48 and magnet 47 and open the ignition ground circuit. The oil level at which this event happens must then be the minimum safe operating oil level.

Shield 43, as described immediately below, acts to trap a pool of lubricating oil 60 (see FIG. 6) therein. This pool of oil 60 rises and falls in relation to the quantity of lubricating oil 14 in the engine sump. However, the entrapped pool of oil 60 is relatively stable compared to the turbulent sump oil 14 during engine operation thereby providing a pool of oil within which the balance beam float assembly 40 can affectively operate.

During engine operation the critical engine parts (bearings and cylinder wall) are lubricated by the "splash and spray" method by action of splasher 12 dipping into and splashing the lubricating oil 14 throughout the sump and cylinder areas. Typically small gasoline engines operate at 3,000 to 3,600 rpm. Thus it should be well appreciated that at this rpm splasher 12 creates a violently, churning and turbulent environment within the engine sump. As observed during engine operation the lubricating oil 14 is in a turbulent state and exhibits a very wavy and irregular surface that is near impossible to directly measure as an indication of the lubricating oil quantity within the sump. It is noted further that the degree of surface turbulence within the sump is greatest in the vicinity of the splasher 12 and dissipates as a function of the distance away from the splasher. It also is evident that the presence of the switch assembly 30 within the sump acts as a baffle thereby having a stabilizing effect on the oil surface adjacent the side opposite the splasher.

As previously described the balance beam float assembly 40 and switching lever 45 are completely enclosed within shield 43. During engine operation lubricating oil may enter the protection shield through top slots 32, side slots 34 and/or bottom holes 36. So long as the oil level within the shield 43 is sufficient to maintain a balance beam float position whereby contact arm 48 of switching lever 45 is outside the magnetic field of contact magnet 47, the electrical switch remains open permitting the engine to run. However, as the oil level within shield 43 decreases permitting float 44 to approach the floor of the shield **43*b* switching lever contact arm 48 enters the magnetic field of magnet 47 and is magnetically attracted to contact magnet 47 thereby closing the grounding circuit and shutting the engine down. The positive action of the magnet prevents dithering of the switching lever 45** and affirmatively shuts the engine down when the predetermined critical oil quantity, within the sump, is reached.

The top slots 32 have been found desirable to permit the exit of foam and bubbles which tend to emerge from the relatively stable oil pool 60. If not permitted to escape, foam and bubbles tend to impose a clockwise moment upon float 44 thereby tending to shut the engine down prematurely.

In the small engine sump environment it is preferred to use a solid material float having a density greater than that of oil as compared to a lighter than oil float. Although the entrapped oil pool 60 is relatively stable as compared to the sump oil 14, pool 60 nevertheless, may experience pulsed fluctuations from splashing oil entering slots 32 and/or 34. The inherent inertia of a lighter than oil float system is significantly less than that of a solid float having a density greater than that of the lubricating oil. Therefore, a lighter than oil float in oil pool 60 will tend to react instantly to such pulsed variations possibly causing premature engine cut-off.

The solid high density float can be made to have a predetermined system inertia by controlling its density. A solid float system may be programmed to have a given movement or response as a function of oil level. Thus a solid float system may be designed to dampen out anticipated pulsed fluctuations of oil pool 60.

It should also be appreciated that the response of balance beam float assembly 40 may be a programmed function of the oil pool 60 level. Thus it is possible to program the response of balance beam float 40 to exhibit a controlled angular rotation proportional to the oil level.

FIG. 7 shows a plot of the angular displacement 0 of balance beam float assembly 40 as a function of oil pool 60 level. A conventional float, not having a specialized configuration, would typically exhibit a function as shown. However by selectively configuring the float 44, the buoyant force and the moment arm of that force may be selectively controlled or varied as a function of oil level thereby providing a programmed angular response as shown for the specially configured float in FIG. 7. The curves shown in FIG. 7 are intentionally distorted to show the relative affect and do no necessarily depict the exact functional relationship between $\theta$ and oil level actually employed. It should be appreciated that this relationship may be expected to vary on a case by case basis. However, having the principles at hand and understanding the physical laws of buoyancy, one may apply the principles taught herein to the particular application at hand.

FIG. 8 schematically shows how one may control the buoyant force $F_b$ and the position of the center of buoyance $C_b$. FIG. 8(*a*) depicts solid float 44 in its non submerged, low oil position. The only force acting upon float 44 in this state is its gravitational weight $F_w$ acting through the float center of gravity $C_g$.

FIG. 8(*b*) depicts the float 44 slightly submerged within oil pool 60. In this state the float displaces a rectangular volume of oil producing buoyant force $F_b$ acting through the center of buoyancy $C_b$ which is the centroid of the volume of oil displaced.

FIG. 8(*c*) shows the float 44 substantially submerged within oil pool 60 and rotated counter clockwise through the angle $\theta$ by the moment produced by buoyant force $F_b$ about the pivot pin 41. It is to be noticed that the buoyant force has not only become larger (more fluid displaced) but that the center of buoyancy has also shifted laterally to the left and vertically upward with respect to the float, and toward the pivot pin 41 thereby shortening the moment arm from $x_b$ in FIG. 8(*a*) to $x_c$. Similarly, by selectively configuring counterweight 42, the buoyancy parameters of counterweight 42 may be controlled in the same way as above described for controlling buoyancy parameters of float 44.

Thus a balance beam float assembly, employing a solid float as taught herein, may be engineered to exhibit a rotational sensitivity that may vary as a function of the fluid level within which it becomes submerged. A balance beam float assembly operating an electrical switch as taught herein may be engineered to respond slowly to the first 25 to 50 percent of sump oil loss thereby assuring that premature switch closure will be avoided and respond more rapidly as the critical level is approached thereby assuring rapid and affirmative switch closure upon reaching the critical oil level.

We claim:

1. Apparatus for measuring the level of a liquid having a turbulent and unsteady surface in an enclosure comprising:

(a) a housing having at least one opening therein positioned within said enclosure partially submerged within said liquid and having means for entrapping a portion of said liquid within said housing, the level of said entrapped portion of said liquid being representative of the average level of said liquid whose surface level is being measured;

(b) a balance beam float assembly positioned within said housing and having counterweight means at one end thereof and float means at the opposite end thereof, said float means extending into and at least partially submerged in said entrapped liquid displacing a portion thereof;

(c) pivot means between said counterweight means and said float means pivotably supporting said balance beam assembly whereby said balance beam float assembly rotates about said pivot means through an angle which is a function of the level of said entrapped liquid within said housing;

(d) means for measuring said angle and providing a readout thereof as an indication of the average level of the liquid whose level is being measured.

2. The apparatus as claimed in claim 1 wherein the density of said float means is greater than that of the liquid whose surface is being measured.

* * * * *